United States Patent [19]
Mamon et al.

[11] 4,153,366
[45] May 8, 1979

[54] RANGEFINDING SYSTEM

[75] Inventors: Glenn Mamon, Chestnut Hill; Douglas G. Youmans, Watertown; Jeffrey A. Volp, Billerica, all of Mass.

[73] Assignee: The Charles Stark Draper Laboratory, Inc., Cambridge, Mass.

[21] Appl. No.: 808,461

[22] Filed: Jun. 21, 1977

[51] Int. Cl.² .......................... G01C 3/08; H04B 1/04
[52] U.S. Cl. ........................................ 356/5; 328/129; 343/5 CM; 343/5 DP; 343/13 R
[58] Field of Search ............ 356/5; 343/5 CM, 5 DP, 343/13 R; 328/129, 130

[56] References Cited

U.S. PATENT DOCUMENTS

| 3,545,861 | 12/1970 | Farnsworth et al. | 343/13 R |
| 3,666,367 | 5/1972 | Farnsworth et al. | 356/5 |
| 3,752,581 | 8/1973 | Everest et al. | 356/5 |

Primary Examiner—S. C. Buczinski
Attorney, Agent, or Firm—Kenway & Jenney

[57] ABSTRACT

A system for determining the range between a reference point and a target by transmitting a pulse toward the target and measuring the time until receipt of a pulse reflected by the target. In an airborne laser altimeter configuration, the reference point may be located on an aircraft and a pulsed laser is directed along a vertical path to the ground. The system measures the duration of a pulse sequence including a first (or start) pulse, representing a pulse transmitted from the reference point, and the last of one or more associated subsequent return pulses, where the return pulses represent reflections of the transmitted pulse from both the ground and interfering objects located between the reference point and the ground. The system generates a replica of the start pulse and subsequent pulses, with the replica being delayed by a predetermined period from the start pulse and associated subsequent return pulses. The undelayed pulse sequence is processed to determine the number of return pulses in that sequence, and this detected number of pulses is utilized to enable a gate which passes only the last return pulse in the delayed pulse sequence. A time interval measurement is performed by a single precision time interval counter which is initiated by the start pulse of the delayed pulse sequence and is disabled by the gated last, or stop, pulse of the delayed pulse sequence.

15 Claims, 5 Drawing Figures

RANGEFINDING SYSTEM

BACKGROUND OF THE DISCLOSURE

The present invention relates to systems for airborne terrain profiling, and more particularly, to laser rangefinding systems.

Airborne terrain profiling and surveying systems are used in a variety of topographic and mapping applications, such as stream-valley profiling. Such profiling and surveying systems typically include an aircraft-mounted rangefinder, or altimeter, system which operates in conjunction with a position-determining system to provide altitude readings corresponding to ground points underlying the aircraft flight path. The accuracy of the rangefinder system is critical to the precision of the resultant altitude readings.

In applications where there is sufficient time to average a large number of readings, the prior art rangefinder systems have been developed with continuous wave (CW) intensity modulated lasers. Intensity modulation is applied to the emitted light beam by way of an acoustic-optic or electro-optic modulator and range measurement is accomplished by electronically determining the phase shift of the return signal with respect to the transmitted signal, with high accuracy being established by utilizing a relatively high modulation frequency. For airborne terrain profiling systems, the CW approach is characterized by a substantial disadvantage in that there is a range ambiguity every $2\pi$ radians of the modulation frequency. Generally, this ambiguity is resolved by using one or more low modulation frequencies, although, in a moving aircraft environment over random terrain which may contain sharp discontinuities in elevation, this technique is not fully effective. A further disadvantage of CW systems is the required heterodyning for transmitted and received waveforms to some lower intermediate frequency so that the phase measurement can be performed with a clock frequency which is relatively low. This necessitates relatively narrow bandwidth which may prevent the receiver from following and tracking rapid changes in phase resulting from sudden changes in terrain elevation. Furthermore, for CW systems, when the laser beam hits multiple targets such as may occur with foliage covered terrain, the phase of the return signal is a composite due to all intercepted targets, making the range measurement meaningless.

Pulsed laser systems are generally used for rangefinding where accuracies of only a few feet are required, such as in many military rangefinding applications, and in long range distance measurements, such as ranging to a retroreflector on the moon or on a satellite. In such systems, an unambiguous range determination is achieved by measuring the propagation time for a light pulse transmitted from a source to the target and reflected back to a receiver at the source location.

However, many pulsed laser systems are limited in application due to limitations in adjacent return pulse resolution. In low altitude airborne terrain profiling applications where the aircraft may be only 3,000 feet above the terrain to be mapped, for example, the conventional pulsed laser systems are particularly ineffective where the terrain may include foliage or other objects which tend to cause multiple reflections of a transmitted laser pulse. For example, when flying over trees, part of the beam may land on a branch or leaf and part of the beam might land on the ground. In such a case, two or more pulses might well be received in response to a single transmitted pulse, and only the last received pulse is representative of the range from the aircraft to the ground. Errors due to returns from multiple targets may be eliminated by detecting the last return pulse and using that pulse for terminating the time interval measurement.

Recently developed ultra-short pulse lasers and sophisticated signal processing techniques have partially overcome these problems and have permitted range accuracies on the order to several inches at such altitudes and under such conditions. Pulsed laser systems are however subject to substantial limitations due to dufficulty in processing the return signals because of variations in amplitude, rise time and shape, and the ever-present requirement to work with nanosecond and subnanosecond triggering circuits and time interval measurements in order to obtain high accuracy.

To compensate for variations in triggering level due to amplitude variations, a "half-max" detector, or constant fraction discriminator, has been developed. This discriminator provides an output pulse that occurs at a time when the amplitude of the received signal reaches a fixed percentage of the peak amplitude. This technique minimizes the variation in triggering point with amplitude changes as long as the rise time is constant.

In the prior art, last return pulse selection has been mechanized in several ways. One approach is to have each successive returned pulse strobe the contents of a time interval counter output on the fly and enter that value into an auxiliary register. However, in cases where high accuracy is required, for example, in an airborne survey profiling system, conventional time interval counters are not satisfactory, since subnanosecond interval counters utilize analog interpolation, and as a result, finite time is required to perform the complete time interval computation and provide the data to a register.

An alternative approach in the prior art has been to employ a pair of time interval counters, the first counter measuring the time from the start, or transmitted, pulse to an arbitrarily generated measurement cycle termination pulse that occurs at a time that exceeds the last possible expected return pulse, and the second counter measuring the time from the stop, or last, pulse to the same cycle termination pulse. The difference in the two counter measurements is the desired time interval from the start to the stop pulse. In the case of multiple returns, each successive stop pulse instantaneously resets and starts the time interval measurement so that the second counter measures the time from the last pulse to arrive at the termination pulse. However, such systems are subject to substantial cost limitations due to the requirement for two precision time interval counters. Furthermore, such counters are relatively large in size, weight and power consumption and consequently, do not lend themselves to airborne applications.

It is an object of the present invention to provide a high accuracy and high resolution rangefinding system suitable for use in airborne terrain profiling.

Another object is to provide a high accuracy and high resolution laser rangefinding system characterized by minimization of multiple reflection noise.

SUMMARY OF THE INVENTION

In accordance with the present invention, a system is provided for measuring the duration of a pulse sequence including a first (or start) pulse, representing a transmitted laser pulse, and the last of one or more associated subsequent pulses, where the latter pulses represent multiple reflection return pulses. The system generates a replica of the start pulse and subsequent pulses, with the replica being delayed by a predetermined period from the start pulse and associated subsequent return pulses. The undelayed pulse sequence is processed to determine the number of return pulses in that sequence, and this detected number of pulses is utilized to enable a gate which passes only the last return pulse in the delayed pulse sequence. A time interval measurement is performed by a single precision time interval counter which is initiated by the start pulse of the delayed pulse sequence and is disabled by the gated last, or stop, pulse of the delayed pulse sequence.

In one form of the invention, the return pulses from the undelayed pulse sequence are used to increment an up-down counter and the return pulses from the delayed pulse sequence are used to subsequently decrement that counter. The counter state is monitored so that a gate is enabled during the decrementing operation when the up-down counter is one count short of its initial count state. The enabled gate passes the next received, or last, pulse in the delayed pulse sequence to the disabling control for the precision time interval counter. The start and last pulses of the delayed pulse sequence are both delayed by the same delay line to provide long-term stability to avoid dependence on the absolute value of the delay.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
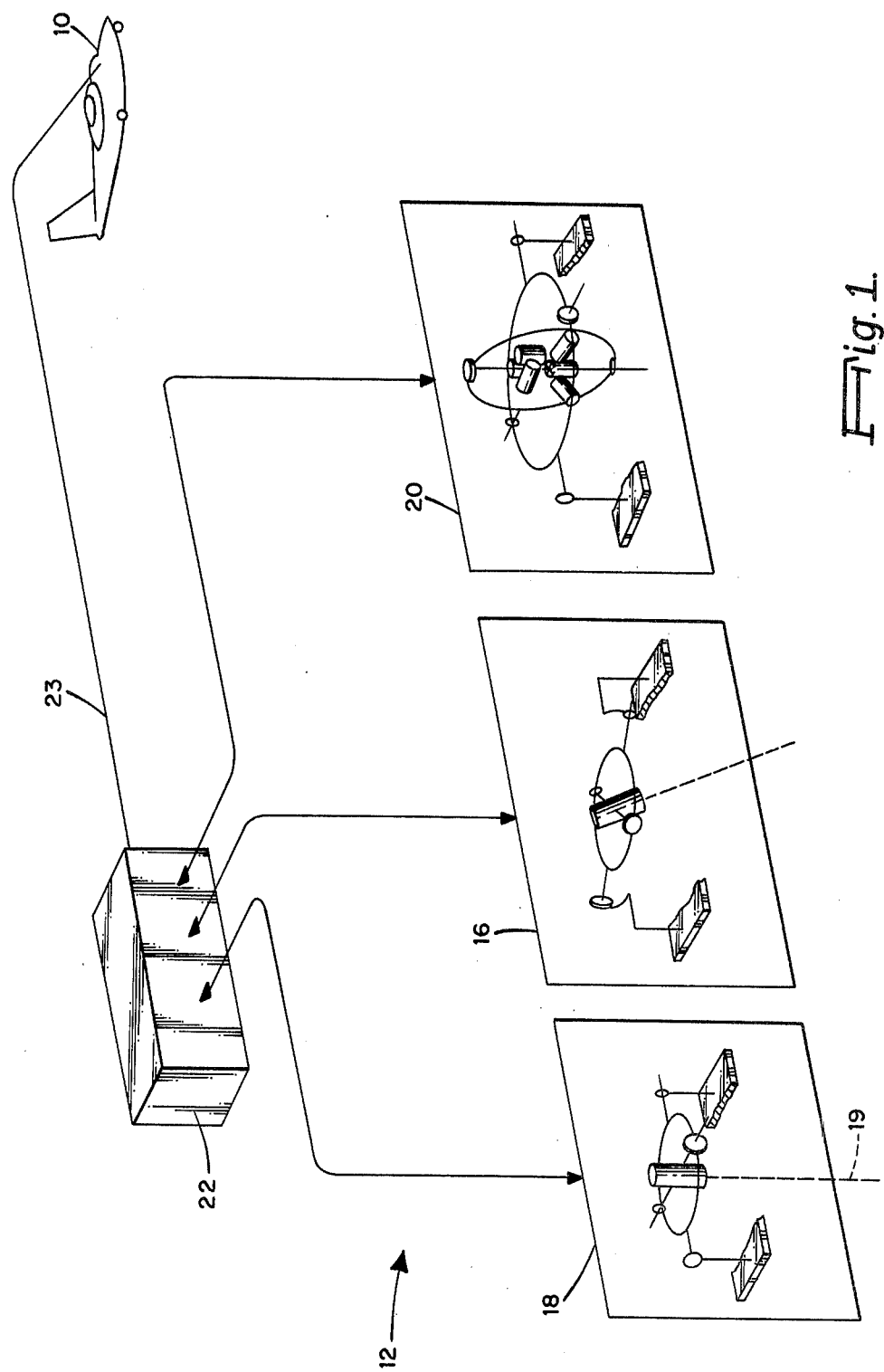
FIG. 1 shows, in block diagram form, a terrain profiling system incorporating a rangefinder system configured in accordance with the present invention.

FIG. 1 shows an aircraft 10 and an associated airborne terrain profiling system 12. The system 12 includes a laser tracker 16, precision inertial platform 20 and data processing and control unit 22, all being conventionally adapted to control the flight pattern of aircraft 10 with respect to ground-based retro-reflectors by way of auto pilot steering commands (signal flow path 23), altimeter 18 which may be conventionally aligned by control unit 22 in a vertical orientation along a precisely defined path 19 which is established with respect to ground-based retro-reflectors. Altimeter 18 is a pulse laser rangefinder, and the present embodiment is shown in detailed block diagram form in FIG. 2. The system 18 includes an altimeter controller 24, a laser transceiver 26 includes a laser transmitter 30 which is responsive to a trigger signal from the controller 24 to transmit a light pulse along a vertical path from the altimeter to the ground.

Transceiver 26 also includes a receiver 32 which is adapted to generate electrical pulses representative of received reflections of the transmitted pulse from the ground. The receiver 32 is also optically coupled to laser transmitter 30 in order to receive a portion of each transmitted laser pulse from the laser and to generate an electrical pulse representative thereof. A constant fraction discriminator 34 is responsive to the receiver pulses to provide a sequence of output pulses comprising a first, or start, pulse representative of the transmitted pulse from laser transmitter 30, and an associated subsequent sequence n return pulses representative of one or more reflections of a transmitted pulse. To compensate for variation in triggering level due to amplitude variations in the return pulse, the "half-max" or constant fraction discriminator 34 provides an output pulse that occurs at a time when the amplitude of a received pulse is a fixed percentage of the peak amplitude of that received pulse. In this way, the discriminator 34 minimizes the variation in the triggering point with amplitude changes for the substantially constant rise time received pulses.

In the receiver 32, the same photodetector is used for both the initial pulse (from the transmitted laser pulse) and the return pulses so that each of those pulses is delayed by the same amount before being applied to the last pulse detector and interval timer network 28.

The last pulse detector and interval timer network 28 includes gate 40 which is selectively enabled by the control 24 to pass each start pulse and its associated sequence of return pulses.

The present embodiment is configured to provide range measurements in response to each of a succession of transmitted laser pulses. The control 24 is adapted to provide an automatic range gate, passing the start pulse and only the associated return pulses falling within a first specific time interval of duration L1 and encompassing the expected time of arrival of the last pulse. For the measurement cycle corresponding to the $i^{th}$ start (or laser) pulse, the start of the first specific time interval is adaptively selected in response to the last pulse associated with the next previous transmitted laser pulse. Where $D_{i-1}$ is the time between the $i-1^{th}$ laser pulse and its associated last return pulse, then the range gate passes both the start pulse (which pulse corresponds to the laser pulse) and any received pulses in the range $D_{i-1}-\alpha$ and $D_{i-1}+\beta$, where $\alpha$ and $\beta$ are constants greater than or equal to zero and the sum $\alpha+\beta$ is greater than zero. The duration of this first predetermined period may readily be selected to accommodate the maximum terrain elevation changes which may occur between transmitted laser pulses.

In the last pulse detector and interval timer network 28, the pulses passed by gate 40 are transferred by way of OR gate 42 to an up-down counter 44. The pulses from gate 40 are also passed by way of a cable driver 46, delay line 48 having a characteristic delay Δ, shaper 50, and OR gate 42 to the up-down (bi-directional) counter 44. In the present embodiment, the up-down counter 44 is controlled by the controller 24 to be preset to its all 1's state in response to each trigger pulse, and to then count up in response to pulses from gate 42 during the first specific time (count up) interval and to count down in response to pulses from gate 42 during a second specific time (count down) interval.

The count up and count down intervals for counter 44 are determined by control signals (S2 and S1, respectively) generated by control 24. The time of occurrence of those control signals is determined by controller 24 based on the detected last pulse resultant from the next previous laser transmission pulse. For the $i^{th}$ measurement cycle, the count up control signal (S2) defines the first specific time interval and has a duratin L1 and extends at least from $D_{i-1} - \alpha$ after the $i^{th}$ laser pulse to $D_{i-1} + \beta$ after the $i^{th}$ laser pulse. The count down control signal (S1) defines the second specific time interval and has a duration L2 where L2 is greater than or equal to L1 and includes the points in the time displaced by $\Delta$ from the beginning and end of the first specific time interval.

A zero detector 52 detects when the counter 44 is in its all 0's state, and at that point generates a stop enable signal which enables the stop gate 54. Since counter 44 was preset to all 1's before counting up the pulses of the undelayed sequence in the first predetermined period, that counter reaches its all 0's state in response to the first return pulse of the undelayed sequence. When the undelayed sequence includes only a single return pulse, counter 44 remains in that all 0's state until receiving the corresponding return pulse of the delayed sequence. In the event there are multiple return pulses, counter 44 reaches its all 0's state a second time in response to the next to last pulse of the delayed sequence, and remains in that all 0's state until the last pulse occurs in the delayed sequence. Accordingly, stop gate 54 passes only that last pulse by way of OR gate 56 to the stop input of a precision interval counter 58. The control 24 also provides a terminate signal by way of OR gate 56 to the stop input of counter 58 in order to terminate the measurement cycle before the next laser transmission pulse in the event no return pulses are detected.

The controller 24 also provides a start enable signal to gate 60, which enables that gate to pass the start pulse in the delayed pulse sequence to the start input of the precision interval counter 58. Counter 58 initiates timing an interval in response to the start pulse passed by gate 60, and terminates timing that interval in response to the stop pulse passed by gate 56. In the present embodiment, counter 58 is a Type 5360A, manufactured by Hewlett-Packard, Palo Alto, California. The counter 58 provides an interval length signal representative of the interval between the start and last pulses in the delayed pulse sequence to the control 24, which in turn may be conventionally interrogated by the data processing and control unit 22.

Accordingly, in operation, the last pulse detector and interval timer network 28 generates a replica of the start pulse and return pulses which is delayed by a predetermined period from the start and return pulses detected by the discriminator 34. The undelayed pulses are used to determine the number of return pulses received and to gate only the last pulse in the delayed pulse pattern. To do so, the up-down counter 44 is controlled to count up in response to the gated return pulses in the undelayed signal, and count down in response to the gated return pulses in the delayed signal until the count state of counter 44 is one count short of the initial count state, with this state providing the gate control for detecting the last return pulse. In this configuration, the start and return pulses go through the same delay line, and thus, long term stability of the absolute value of the delay is inconsequential, although the delay must be equal to or greater than the length of time in which the up-down counter is in its count up mode, i.e. the length of the first specific time interval, and must be less than or equal to the length of time the up-down counter is in its count down mode, i.e. the length of the second specific time interval.

In alternative embodiments, the delay $\Delta$ may be selected to be greater than the duration of the pulse sequence to be measured, and the up-down counter 44 may be replaced by a pair of counters and a comparator means for identifying when the count states of the two counters differ by one count. In this form of the invention, all of the return pulses may be passed by gate 40, rather than only those in a specific time interval. In this alternative form, one of the counters is directly responsive to gate 40 (i.e. undelayed pulses) and the other counter is responsive to pulse shaper 50 (i.e. to the delayed pulses).

Figure 3:
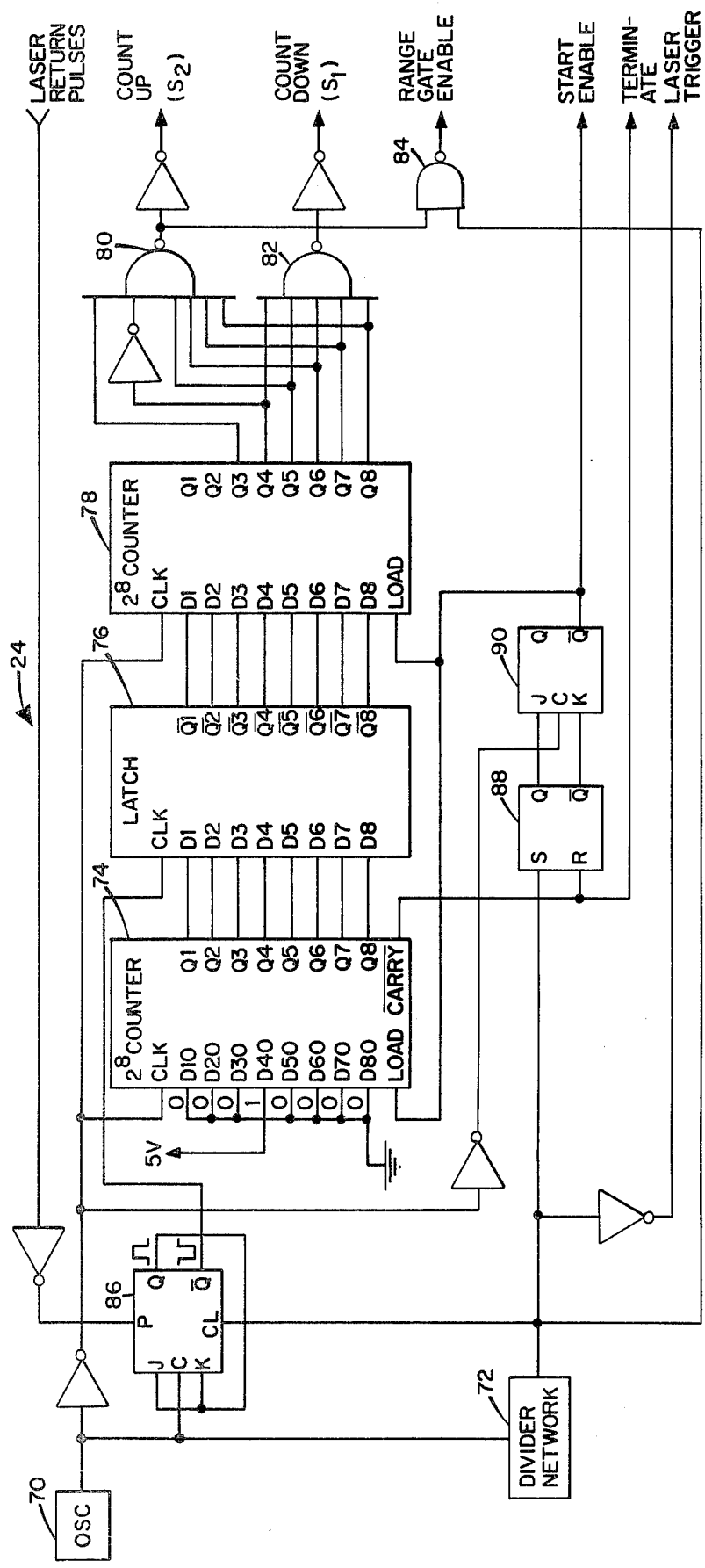
FIG. 3 shows, in schematic form, the altimeter controller of the rangefinder system of FIG. 2.

An exemplary configuration for altimeter control 24 is shown in detailed from in FIG. 3. Control 24 generates the timing signals for the altimeter 18 by way of oscillator 70. The output of oscillator 70 is divided down by divider and pulse generator network 72 to provide a periodic laser trigger signal. The controller 24 also includes a first counter 74, latch 76 and a second counter 78. The state of counter 78 is decoded by NAND gates 80 and 82, with gate 80 providing the count up signal S2 for block 28 and gate 82 providing the count down signal S1 for block 28. The range gate enable signal is provided by NAND gate 84, as controlled by the laser trigger signal and NAND gate 80. Flip-flops 86, 88 and 90 provide synchronization for the return pulses, and control pulses for loading the counters.

In a synchronous form, such as illustrated in FIG. 3, the controller 24 generates count up and count down control signals for counter 44 which are multiples of the clock period. With specific reference to the FIG. 3 configuration, the oscillator 70 provides a periodic clock signal having period T. For the $i^{th}$ measurement cycle, the start pulse initially presets counter 74 to a predetermined count state (greater than or equal to $\Delta/T$). Thereafter during the cycle, the clock signal increments counter 74 toward its overflow state. The latch 76 is responsive to each return pulse to store the complement of the then current count state of counter 74. The counter 78 is responsive to the start pulse during the $i^{th}$ measurement cycle to be preset to the count state corresponding to complement stored in the latch 76 at the beginning of that cycle, where that complement represents the complement of the count state $(S_{i-1})$ of counter 74 associated with the last return pulse of the $i-1^{th}$ measurement cycle. Thereafter during the $i^{th}$ cycle, the clock signal increments counter 78 toward its overflow state. Gate 80 decodes counter 78 to provide the $i^{th}$ cycle count up signal S2 commencing when the counter 78 count state is less than $S_{i-1}$ by A counts and continuing until the counter 78 count state exceeds $S_{i-1}$ by B counts. In this configuration, the sum A+B equals the product L1/T. Gate 82 decodes counter 78 to provide the $i^{th}$ cycle count down signal S1 commencing at a time when the counter 78 count state is greater than $S_i1 + B$ and less than $S_{i-1}+C$ and continuing at least until the counter 78 count state exceeds $S_{i-1}+A+B+C$, where C is less than $\Delta/I - A$. By way of example, in the present embodiment, oscillator 70 provides a 20 MHz squarewave timing signal (T=50 nanoseconds) which is divided down by network 72 to provide a 1 KHz trigger signal. The delay line 48 introduces a 250 nanosecond delay ($=\Delta$) to the pulses passing therethrough. The counters 74 and 78 are independent 8 bit counters clocked from the 20 MHz oscillator 70. The first counter 74 provides a measure of the time it takes for the last return pulse to be received. The second counter 78 controls the operation of the last pulse detector 28. Both counters 74 and 78 are enabled at the time of the laser trigger pulse, and increment with each clock pulse (i.e. every 50 nanoseconds). For the $i^{th}$ measurement cycle, prior to the enabling of counters 74 and 78, the first counter 74 is preset to a count of 8 (Corresponding to 400 nanoseconds based on the 20 MHz clock rate) and the counter 78 is preset to the 1's complement of the count state ($S_{i-1}$) stored in latch 76 representing the last return pulse from the next previous ($i-1^{th}$) mesurement cycle.

In each measurement cycle, the later return pulses are synchronized by flip-flop 86, and each synchronized pulse transfers the current count state from counter 74 into latch 76. Thus, in the event more than one return pulse is received during a cycle, only the most recent count state is stored in latch 76. Accordingly, the signal stored in the latch is representative of 8 plus the number of 20 MHz clock pulses counted between the trigger and the most recently received return pulse, and by the end of a measurement cycle, the signal stored in latch 76 represents the time interval up to receiving the last return pulse.

The inverted outputs of the latch are used to preset the counter 78 at the beginning of each measurement cycle. With the latch output being a 1's complement, the counter 78 is preset to a count state that is 9 plus n clock pulses from overflow for that counter. Since it takes up to one clock cycle to store the count state of the counter 74 in the latch 76, the counter 78 is from nine to ten pulses (i.e. 450 to 500 nanoseconds) short of overflow at the expected time of the last return pulse. The NAND gate 84 provides the range gate enable signal which passes the start pulse through gate 40 as well as all return pulses which are detected in the period between 400 and 600 nanoseconds before counter 78 overflows. The NAND gate 80 decodes counter 78 and applies a 200 nanosecond duration count up signal (S2) to counter 44 commencing at 600 nanoseconds before overflow and ending 400 nanoseconds before overflow of counter 78. Since the last pulse is expected 450 to 500 nanoseconds before overflow, this pulse is passed by gates 40 and 42 and increments up-down counter 44. At 400 seconds prior to overflow (i.e. 50 to 100 nanoseconds after the expected arrival of the last pulse), NAND gate 82 decodes counter 78 and applies a 400 nanosecond duration count down signal (S1) to counter 44 until the counter 78 overflows, terminating a measurement cycle. During this latter period, the delayed pulses from delay line 48 are passed by way of shaper 50 and gate 42 to decrement up-down counter 44. When counter 44 reaches its zero state, indicating there is one pulse remaining in the delay line 48, the zero detector 52 enables gate 54 to pass that last pulse from delay line 48 and shaper 50 to the stop input of timer 58.

Figure 2:
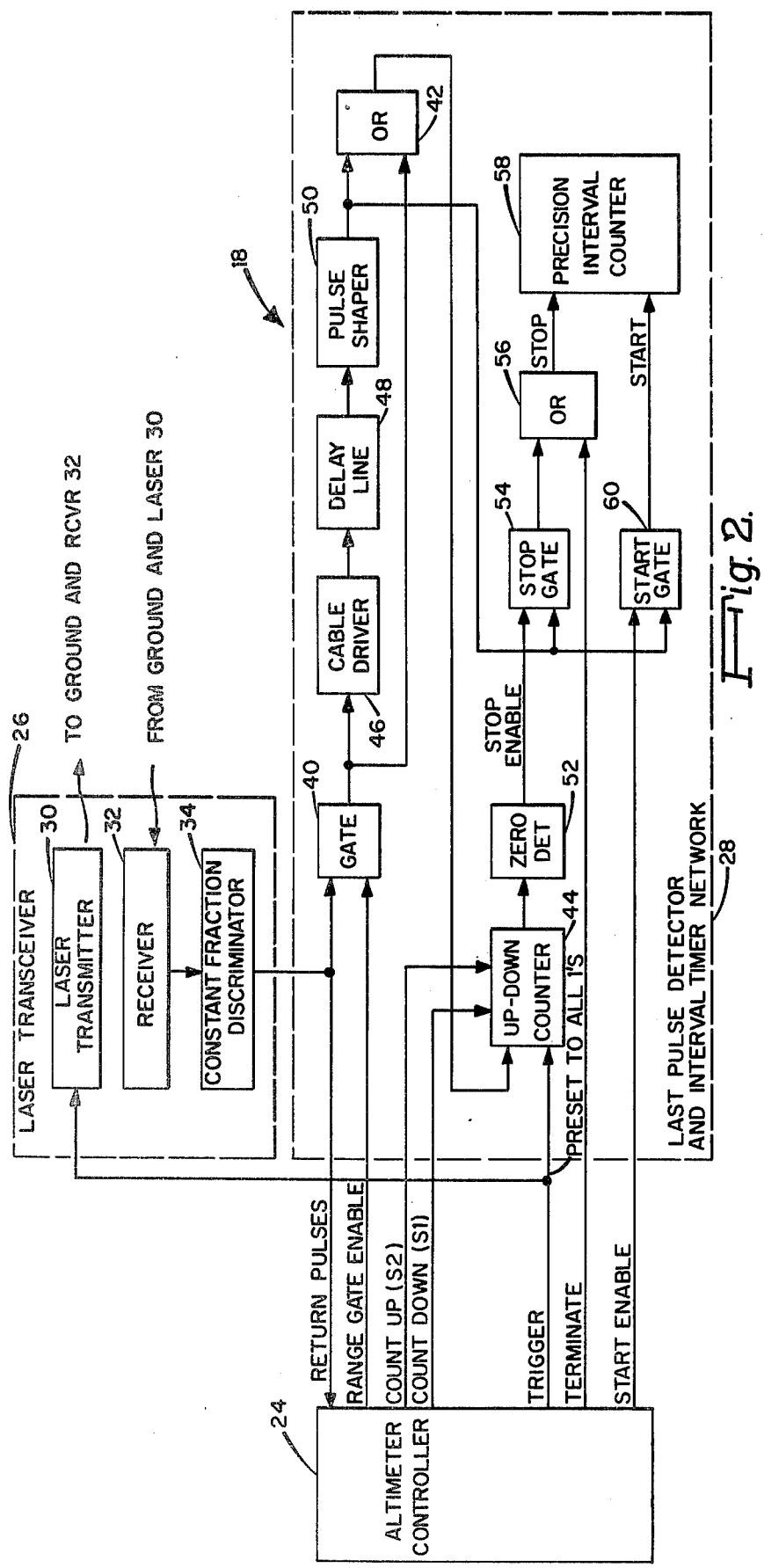
FIG. 2 shows, partially in schematic and partially in block diagram form, an exemplary rangefinder system in accordance with the present invention.
Figure 4A:
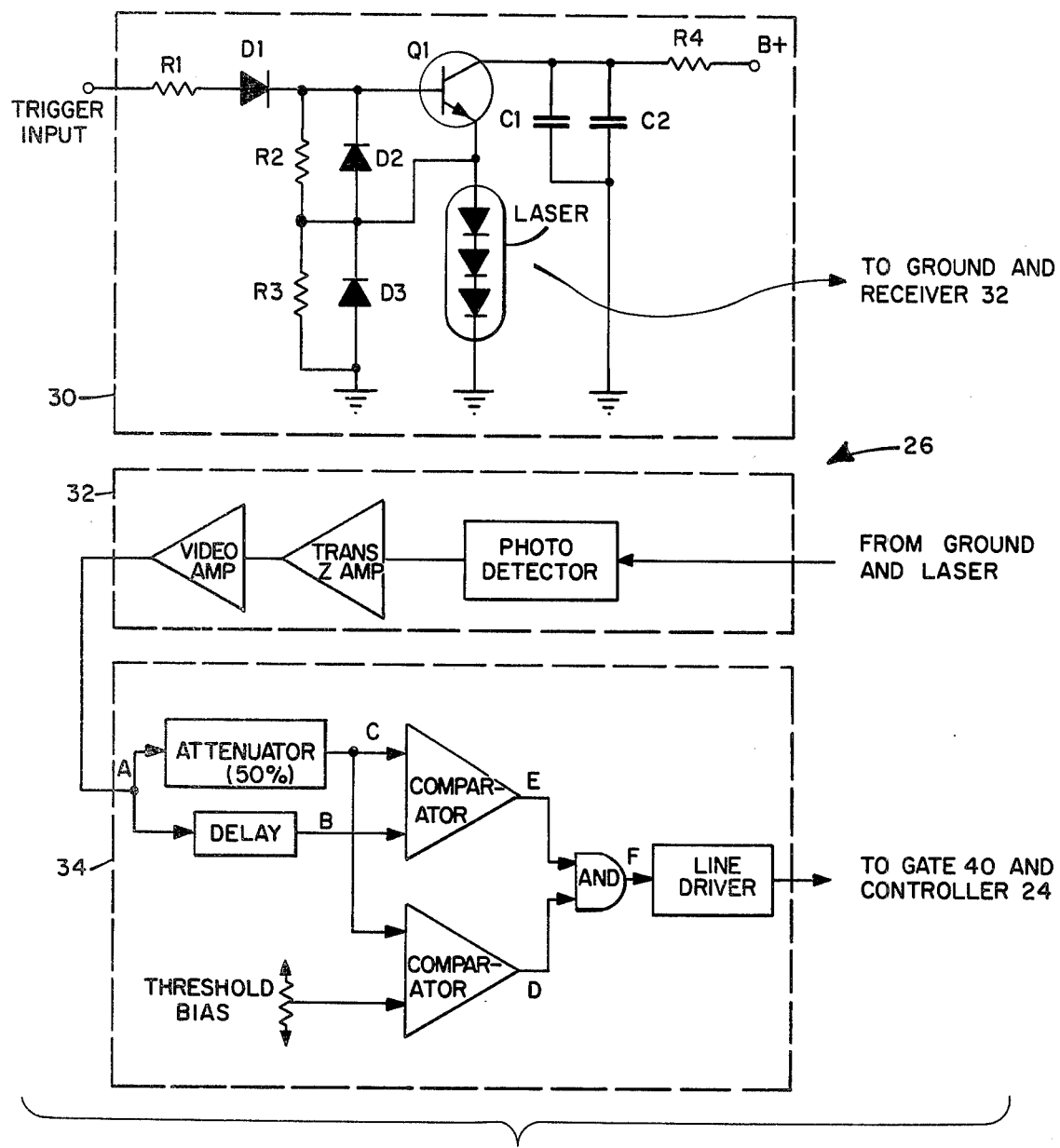
FIG. 4A shows, partially in schematic and partially in block diagram form, an exemplary laser transceiver for the system of FIG. 2.

FIG. 4A illustrates an exemplary configuration for the laser transceiver 26 of the embodiment of FIGS. 1-3 and suitable for achieving altimeter accuracy on the order of ± 0.5 feet over foliated terrain in an aircraft environment at altitudes of approximately 3,000 feet. The laser element in transmitter 30 is a gallium-arsenide laser RCA TYPE SG3001. Suitable component values for the other circuit elements in laser transmitter 30 are shown in the Table below.

TABLE

| | |
|---|---|
| R1 | 100 ohms |
| R2,R3 | 500 ohms |
| R4 | 33 kohms |
| D1 | 1N4148 |
| D2,D3 | 1N5431 |
| C1,C2 | 1800-2200pF |
| Q1 | 2N3507 |
| B+ | 90-25Vdc |

Figure 4B:
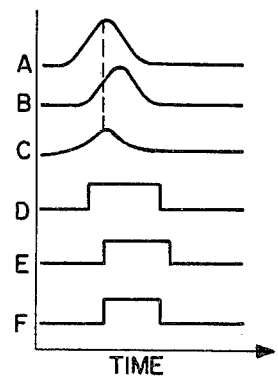
FIG. 4B shows waveforms illustrating the operation of the discriminator of the transceiver of FIG. 4A.

The receiver 32 comprises an RCA Type C30817 silicon avalanche photodetector coupled by way of a Texas Instruments TI XL151 50 MHz and video amplifier, threshold detector and line driver to the constant fraction discriminator 34. The operation of discriminator 34 is illustrated in FIG. 4B, which shows waveforms for the points A-E in FIG. 4A. By way of example, Type AM685 high speed comparators, manufactured by Advanced Microdevices, Sunnyvale, California, are used in discriminator 34 of the present embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for measuring the duration of a first pulse sequence, said first pulse sequence including a first pulse and n subsequent pulses, comprising:
   A. delay means for delaying said first pulse sequence to provide a second pulse sequence corresponding to said first pulse sequence but delayed by a predetermined period,
   B. first counting means responsive to said first pulse sequence to count the pulses of said first pulse sequence,
   C. second counting means responsive to said second pulse sequence to count the pulses of said second pulse sequence,
   D. first detection means to detect the occurrence of the first pulse in said second pulse sequence,
   E. second detection means and associated gate means, said second detection means being responsive to said first and second counting means to provide an enabling signal when said second counting means has counted the first n—1 of said subsequent pulses of said second pulse sequence, and said gate means being responsive to said enabling signal and said second pulse sequence to pass only the last pulse of said second pulse sequence, and
   F. interval timing means responsive to said first detection means to begin timing the duration of said second pulse sequence in response to said detected occurrence of said first pulse in said second pulse sequence, and responsive to said last pulse passed by said gate means to terminate timing, the duration of said second pulse sequence being representative of the duration of said first pulse sequence.

2. The system of claim 1 wherein said first counting means is operative only for a first predetermined interval including a predetermined arrival period in which the last pulse of said first pulse sequence is expected to occur, said first pulse interval being shorter than the duration of said first pulse sequence, and wherein said second counting means is operative only for a second predetermined interval, said second predetermined interval corresponding to said first predetermined interval but delayed by said predetermined period.

3. The system of claim 2 wherein the length of said predetermined period and the length of said first and second predetermined intervals are related so that said first and second predetermined intervals are non-overlapping, and wherein said first and second counter means comprise a bi-directional counter operative to count in one direction in said first predetermined interval, and to count in the other direction in said second predetermined interval.

4. A system for measuring the duration of a first pulse sequence, said first pulse sequence including a first pulse and n subsequent pulses, comprising:

A. gating means for generating a gated pulse sequence including a gated first pulse and gated subsequent pulses respectively corresponding to said first pulse and ones of said n subsequent pulses occurring within a first time interval, said first time interval having a predetermined length L1 and including the last of said subsequent pulses, B. delay means responsive to said gating means, said delay means for generating a delayed pulse sequence including a delayed first pulse and delayed subsequent pulses respectively corresponding to said gated first pulse and said gated subsequent pulses but delayed by a delay period Δ equal to or greater than the length L1 of said first time interval, C. first counter means operative during said first time interval to count said gated subsequent pulses, D. second counter means operative during a second time interval having a length L2 equal to or greater than the length L1 of said first time interval and including points in time displayed by Δ from the beginning and end of said first time interval, said second counter means including means to count said delayed subsequent pulses, E. first detection means responsive to said delay means to detect the occurrence of said delayed first pulse and to generate a start control signal representative thereof, F. second detection means and associated gating means responsive to said first and second counter means to provide an enabling signal when said second counter means has counted the first n-1 of said delayed subsequent pulses, and said associated gating means being responsive to said enabling signal and said delay means to detect the occurrence of the last of said delayed subsequent pulses and to generate a stop control signal representative thereof, G. interval timing means responsive to said start control signal to begin timing the duration of said second pulse sequence and to said stop control signal to terminate timing the duration of said second pulse sequence, the duration of said second pulse sequence being representative of the duration of said first pulse sequence.

5. A system according to claim 4 and adapted to measure the respective durations of a succession of first pulse sequences, wherein the duration $D_i$ of the $i^{th}$ first pulse sequence is in the range:

$$D_{i-1} - \alpha \leq D_i \leq D_{i-1} + \beta$$

where i is an integer greater than zero, $D_{i-1}$ is the duration of the $i-1^{th}$ first pulse sequence, and $\alpha$ and $\beta$ are predetermined constants and are greater than or equal to zero and the sum $\alpha + \beta$ is greater than zero, further comprising:

A. gate control means operative for the $i^{th}$ first pulse sequence to generate a gate enabling signal for said gate means, said gate enabling signal including for the $i^{th}$ first pulse sequence:

i. a first portion coincident with the first pulse of said first pulse sequence, and ii. a second portion having a duration L1, and where said second portion extends at least from $D_{i-1} - \alpha$ after said first gated pulse, to $D_{i-1} + \beta$ after said first gated pulse, said second portion defining said first time interval, B. first counter control means operative for the $i^{th}$ first pulse sequence to generate a first counter enabling signal for said first counter means, said first counter enabling signal including a portion coincident with said second portion of said gate enabling signal, and C. second counter control means operative for the $i^{th}$ first pulse sequence to generate a second counter enabling signal for said second counter means, said second counter enabling signal including a portion having a duration greater than or equal to L1 and including points in time displaced by Δ from the beginning of said second portion of said gate enabling signal, said second counter enabling signal defining said second time interval.

6. A system according to claim 5 wherein said first and second counter means comprise a bi-directional counter operative to count in one direction during said first time interval and to count in the other direction during said second time interval.

7. A system according to claim 4 and adapted to measure the respective durations of a succession of first pulse sequences, wherein the duration $D_i$ of the $i^{th}$ first pulse sequence is in the range:

$$D_{i-1} - \alpha D_i \leq D_{i-1} + \beta$$

where i is an integer greater than zero, $D_{i-1}$ is the duration of the $i-1^{th}$ first pulse sequence, and $\alpha$ and $\beta$ are predetermined constants and are greater than or equal to zero, and the sum $\alpha + \beta$ is greater than zero, further comprising:

A. clock generator for generating a clock pulse signal having a predetermined repetition rate, B. third counter means, said third counter means being responsive to the first pulse of the $i^{th}$ first pulse sequence to preset to a first predetermined count state, and thereafter to increment with each clock pulse, said first predetermined count state being representative of a time period greater than or equal to Δ at said clock rate, C. latch means responsive to each of said gated pulses of said $i^{th}$ first pulse sequence to store the complement of the current count state of said third counter means, D. fourth counter means responsive to said first pulse of said $i^{th}$ first pulse sequence to preset said fourth counter means to the count state corresponding to said complement stored in said latch means, and said complement being representative of the complement of the count state $S_{i-1}$ of said third counter means associated with the last of said subsequent pulses of the $i-1^{th}$ first pulse sequence, and thereafter to increment with each clock pulse.

E. first counter control means operative for the $i^{th}$ first pulse sequence and including a first decoding network responsive to the count state of said fourth counter means to generate a first counter enabling signal when the count state of said fourth counter means is less than $S_{i-1}$ by A counts and until the count state of said fourth counter means exceeds $S_{i-1}$ by B counts, where A and B are integers and the sum of A and B equals the product L1 and said clock rate, said first counter enabling signal defining said first time interval, F. second counter control means operative for the $i^{th}$ first pulse sequence and including a second decoding network responsive to the count state of said fourth counter means to generate a second counter enabling signal when the count state of said fourth counting means is greater than $S_{i-1}+B$ and less than $S_{i-1}+C$ and at least until the count state of said fourth counter means exceeds $S_{i-1}+C+A+B$, where C is less than the product of $\Delta$ and said clock rate less A, said second counter enabling signal defining said second time interval, and G. gate control means opertive during each first pulse sequence and including a logic network responsive to said first pulse and to said first decoding network to generate a gate enabling signal for said gate means, said gate enabling signal including
   i. a first portion coincident with the first pulse of said first pulse sequence, and
   ii. a second portion coincident with said first counter enabling signal.

8. A system according to claim 7 wherein said first and second counter means comprise a bi-directional counter operative to count in one direction during said first time interval and to count in the other direction during said second time interval.

9. A system according to claim 4 wherein said first and second counter means comprise a bi-directional counter operative to count in one direction during said first time interval and to count in the other direction during said second time interval.

10. Laser rangefinding system comprising:
   means to transmit at least one laser pulse from a reference point to a target,
   means to detect at said reference point a first pulse sequence including a first pulse, said first pulse corresponding to said laser pulse, and further including n subsequent pulses, said subsequent pulses being reflections of said laser pulse, and
   means for measuring the duration of said first pulse sequence comprising:
   A. gating means for generating a gated pulse sequence including a gated first pulse and gated subsequent pulses respectively corresponding to said first pulse and ones of said n subsequent pulses occurring within a first time interval, said first time interval having a predetermined length L1 and including the last of said subsequent pulses,
   B. delay means responsive to said gating means, said delay means for generating a delayed pulse sequence including a delayed first pulse and delayed subsequent pulses respectively corresponding to said gated first pulse and said gated subsequent pulses but delayed by a delay period $\Delta$ equal to or greater than the length L1 of said first time interval,
   C. first counter means operative during said first time interval to count said gated subsequent pulses,
   D. second counter means operative during a second time interval having a length L2 equal to or greater than the length L1 of said first time interval and including points in time displaced by $\Delta$ from the beginning and end of said first time interval, said second counter means including means to count said delayed subsequent pulses,
   E. first detection means responsive to said delay means to detect the occurrence of said delayed first pulse and to generate a start control signal representative thereof,
   F. second detection means and associated gating means responsive to said first and second counter means to provide an enabling signal when said second counter means has counted the first $n-1$ of said delayed subsequent pulses, and said associated gating means being responsive to said enabling signal and said delay means to detect the occurrence of the last of said delayed subsequent pulses and to generate a stop control signal representative thereof,
   G. interval timing means responsive to said start control signal to begin timing the duration of said second pulse sequence and to said stop control signal to terminate timing the duration of said second pulse sequence, the duration of said second pulse sequence being representative of the duration of said first pulse sequence.

11. A system according to claim 10 and adapted to measure the respective durations of a succession of first pulse sequences, wherein the duration $D_i$ of the $i^{th}$ first pulse sequence is in the range:

$$D_{i-1}-\alpha \leq D_{i-1}+\beta$$

where i is an integer greater than zero, $D_{i-1}$ is the duration of the $i-1^{th}$ first pulse sequence, and $\alpha$ and $\beta$ are predetermined constants and are greater than or equal to zero, and the sum $\alpha+\beta$ is greater than zero, further comprising:
   A. gate control means operative for the $i^{th}$ first pulse sequence to generate a gate enabling signal for said gate means, said gate enabling signal including for the $i^{th}$ first pulse sequence:
   i. a first portion coincident with the first pulse of said first pulse sequence, and
   ii. a second portion having a duration L1, and where said second portion extends at least from $D_{i-1}-\alpha$ after said first gated pulse, to $D_{i-1}+\beta$ after said first gated pulse, said second portion defining said first time interval,
   B. first counter control means operative for the $i^{th}$ first pulse sequence to generate a first counter enabling signal for said first counter means, said first counter enabling signal including a portion coincident with said second portion of said gate enabling signal, and
   C. second counter control means operative for the $i^{th}$ first pulse sequence to generate a second counter enabling signal for said second counter means, said second counter enabling signal including a portion having a duration greater than or equal to L1 and including points in time displaced by Δ from the beginning of said second portion of said gate enabling signal, said second counter enabling signal defining said second time interval.

12. A system according to claim 11 wherein said first and second counter means comprise a bi-directional counter operative to count in one direction during said first time interval and to count in the other direction during said second time interval.

13. A system according to claim 10 and adapted to measure the respective durations of a succession of first pulse sequences, wherein the duration $D_i$ of the $i^{th}$ first pulse sequence is in the range:

$$D_{i-1} - \alpha \leq D_i \leq D_{i-1} + \beta$$

where i is an integer greater than zero, $D_{i-1}$ is the duration of the $i-1^{th}$ first pulse sequence, and $\alpha$ and $\beta$ are predetermined constants and are greater than or equal to zero, and the sum $\alpha + \beta$ is greater than zero, further comprising:

A. clock generator for generating a clock pulse signal having a predetermined repetition rate, B. third counter means, said third counter means being responsive to the first pulse of the $i^{th}$ first pulse sequence to preset to a first predetermined count state, and thereafter to increment with each clock pulse, said first predetermined count state being representative of a time period greater than or equal to Δ at said clock rate, C. latch means responsive to each of said gated pulses of the $i^{th}$ first pulse sequence to store the complement of the current count state of said third counter means, D. fourth counter means responsive to said first pulse of said $i^{th}$ first pulse sequence to preset said fourth counter means to the count state corresponding to said complement stored in said latch means, and said complement being representative of the complement of the count state $S_{i-1}$ of said third counter means associated with the last of said subsequent pulses of the $i-1^{th}$ first pulse sequence, and thereafter to increment with each clock pulse, E. first counter control means operative for the $i^{th}$ first pulse sequence and including a first decoding network responsive to the count state of said fourth counter means to generate a first counter enabling signal when the count state of said fourth counter means is less than $S_{i-1}$ by A counts and until the count state of said fourth counter means exceeds $S_{i-1}$ by B counts, where A and B are integers and the sum of A and B equals the product L1 and said clock rate, said first counter enabling signal defining said first time interval, F. second counter control means operative for the $i^{th}$ first pulse sequence and including a second decoding network responsive to the count state of said fourth counter means to generate a second counter enabling signal when the count state of said fourth counting means is greater than $S_{i-1} + B$ and less than $S_{i-1} + C$ and at least until the count state of said fourth counter means exceeds $S_{i-1} + C + A + B$, where C is less than the product of Δ and said clock rate less A, said second counter enabling signal defining said second time interval, and G. gate control means operative during each first pulse sequence and including a logic network responsive to said first pulse and to said first decoding network to generate a gate enabling signal for said gate means, said gate enabling signal including
  i. a first portion coincident with the first pulse of said first pulse sequence, and
  ii. a second portion coincident with said first counter enabling signal.

14. A system according to claim 13 wherein said first and second counter means comprise a bi-directional counter operative to count in one direction during said first time interval and to count in the other direction during said second time interval.

15. A system according to claim 10 wherein said first and second counter means comprise a bi-directional counter operative to count in one direction during said first time interval and to count in the other direction during said second time interval.

* * * * *